(12) United States Patent
Fujita et al.

(10) Patent No.: US 7,026,088 B2
(45) Date of Patent: Apr. 11, 2006

(54) MASTER BATCH AND TONER FOR USE IN ELECTROPHOTOGRAPHY

(75) Inventors: Sayaka Fujita, Kashihara (JP); Katsuru Matsumoto, Nara (JP); Toshihiko Murakami, Kashiba (JP); Eiji Tenjiku, Osaka (JP)

(73) Assignee: Sharp Kabushiki Kaisha, Osaka-fu (JP)

( * ) Notice: Subject to any disclaimer, the term of this patent is extended or adjusted under 35 U.S.C. 154(b) by 184 days.

(21) Appl. No.: 10/694,361

(22) Filed: Oct. 28, 2003

(65) Prior Publication Data
US 2004/0087708 A1 May 6, 2004

(30) Foreign Application Priority Data
Nov. 6, 2002 (JP) .............................. 2002-321988

(51) Int. Cl.
G03G 9/00 (2006.01)
(52) U.S. Cl. .............................. 430/108.9; 430/109.4; 524/495; 524/496
(58) Field of Classification Search ................ 524/495, 524/496; 430/108.9, 109.4
See application file for complete search history.

(56) References Cited

U.S. PATENT DOCUMENTS
6,121,369 A * 9/2000 Stack et al. .................. 524/495

FOREIGN PATENT DOCUMENTS
| JP | 61-156054 | 7/1986 |
| JP | 62-030259 | 2/1987 |
| JP | 63-205664 | 8/1988 |
| JP | 10-319642 A | 12/1998 |

* cited by examiner

Primary Examiner—Mark A. Chapman
(74) Attorney, Agent, or Firm—Nixon & Vanderhye P.C.

(57) ABSTRACT

The master comprises a polyester resin as a binder resin and a carbon black as a colorant having a primary particle size of 10 nm to 100 nm, is blended with 30 to 60 parts by weight of the carbon black, has a lightness L* of 20 or more; and the reflectance A at 400 nm thereof and the reflectance B at 700 nm thereof fall within the range satisfying the relation given by the following formula [1]:

$$0.5 < B/A < 5 \quad [1]$$

The carbon black in the toner can be made to be present stably in the conditions such that the carbon black has a small primary particle size and is homogeneously dispersed.

8 Claims, 1 Drawing Sheet

FIG. 1

MASTER BATCH AND TONER FOR USE IN ELECTROPHOTOGRAPHY

BACKGROUND OF THE INVENTION

1. Field of the Invention

The present invention relates to a carbon black master batch for use in a toner used in electrophotography and the like and a toner for use in electrophotography (electrostatic charge image development).

2. Description of the Related Art

A large number of methods are known as the electrophotography method as described in Patent Document 1; in general, taking advantage of photo conductive materials, electric latent images are formed on photoreceptors by means of various procedures, the electric latent images are developed by use of toner, the toner images are transferred electrostatically, according to need, to recording media such as paper, and copied matters are obtained by fixing the toner images by applying heat, pressure, or solvent vapor.

Additionally, a variety of methods have hitherto been proposed for the methods of developing by using toner and the methods of fixing toner images, and the methods appropriate to the respective image formation processes have been adopted.

Furthermore, in these years, for the above described electrophotography, advanced techniques including speed up of copying, enhancement of image quality, and high stability have been demanded.

On the other hand, the toner used in the above described electrophotography is obtained by mixing, melt-kneading, subsequent crushing and classifying of a raw material containing a binder resin, dyes/pigments as colorants, an electric charge control agent, wax and the like.

In this connection, an important point is that the additives including dyes/pigments and electric charge control agent are made to be dispersed in the binder resin in a homogeneous condition.

In other words, the poor dispersion of these additives degrades the charging characteristics, leads to the image characteristics variation, and makes a cause for generation of image deterioration including fogging and toner scattering.

As a typical production method of toner, for example, a method is adopted in which the raw materials including colorants, an offset preventing agent and an electric charge control agent are dispersed by melt-kneading in a binder resin such as styrene resin, styrene-(meth)acrylic resin, polyester resin or epoxy resin, then the kneaded material is pulverized by means of a pulverizing mill, the pulverized material is classified by means of a classifying apparatus, and thus a toner having a desired particle size is obtained.

In such a case, carbon black is widely used as a colorant for use in black toner.

However, when the carbon black is not fully dispersed in such a toner produced as described above, the carbon black tends to expose itself on the toner surface, which sometimes leads to the partial reduction of the electric resistance of the toner because carbon black is generally a conductor, thus varying the toner charge amount.

Consequently, the variation in the image characteristics, fogging and toner scattering tend to occur, resulting in poor recording stability.

Several measures have been proposed for such problems associated with the poor dispersion.

Examples of such measures include a method in which preliminarily prepared is a so-called master batch that is made to contain in a binder resin dyes/pigments in higher concentrations than the concentrations of dyes/pigments in the toner, and the above described master batch is used as a colorant.

A primary method for producing a master batch is the one in which a binder resin and dyes/pigments are mixed together preliminarily, and then further subjected to two-roller kneading.

However, the associated state of affairs is such that in this method the dyes/pigments are not fully dispersed in the binder resin and thus no sufficiently satisfactory stability is attained.

Additionally, a method similar to that described above, for example, a method described in Patent Document 2 is the one in which a master batch produced on the basis of a method similar to that described above is pulverized, then the resin remaining to be blended is blended together, and the mixture thus obtained is melt-kneaded; in this described method, too, the extent of dispersion of the dyes/pigments in the master batch is expected to govern eventually and largely the dispersion behavior of the dyes/pigments in the toner, accordingly leaving some doubt as to the provision of beneficial effects.

Additionally, Patent Document 3 describes a method in which a strong shearing force is applied in the course of the production of a master batch that is made to contain high concentrations of dyes/pigments in a binder resin, while on the contrary a weak shearing force is applied in a kneading process for dilution; however, it is probably impossible to obtain effects leading to attainment of a satisfactory dispersion.

Other relevant methods include, for example, another method for producing a master batch described in Patent Document 4 in which the raw materials are dissolved in a solvent to be mixed together, and then the solvent is evaporated to yield a master batch; no sufficient shearing force can be applied merely by stirring the solution mixture, and hence some doubts are raised as to whether these other methods can attain a satisfactory dispersion of such pigments as carbon black for use in a toner or not.

[Patent Document 1]
U.S. Pat. No. 2,297,691 specification.

[Patent Document 2]
Japanese Patent Laid-Open No. 62-30259.

[Patent Document 3]
Japanese Patent Laid-Open No. 63-205664.

[Patent Document 4]
Japanese Patent Laid-Open No. 61-156054.

Thus, the first object of the present invention is to provide a carbon black master batch for use in a toner capable of obtaining a toner which can make the carbon black be present stably in the conditions such that the carbon black has a small primary particle size and is dispersed homogeneously in the toner, can attain a high image density even with a small amount of the toner, and itself has a high blackness.

The second object of the present invention is to provide a toner for use in electrophotography (electrostatic charge image development) capable of yielding a desired image density by use of a smaller adhesion amount of toner (consumption amount), capable of preventing the occurrence of toner scattering and image fogging, and capable of thereby stably maintaining satisfactory image characteristics.

The third object of the present invention is to provide a toner for use in electrophotography (electrostatic charge image development) capable of yielding a desired image density by use of a smaller adhesion amount (consumption amount) of toner, capable of preventing the occurrence of toner scattering and image fogging, capable of thereby stably maintaining satisfactory image characteristics, and additionally capable of covering sheets of paper (media) with the toner particles leaving smaller blank space so that sheets of paper (media) become nondiaphanous, the concealment property is improved and the image density can be increased.

SUMMARY OF THE INVENTION

The above described objects are accomplished by the present invention described below.

The first present invention capable of accomplishing the above described objects is a carbon black master batch for use in a toner which comprises polyester resin as a binder resin and a carbon black as a colorant of 10 nm to 100 nm in primary particle size, is blended with 30 to 60 parts by weight of the carbon black and has a lightness L* of 20 or less, wherein the reflectance A thereof at 400 nm and the reflectance B thereof at 700 nm fall within the range satisfying the relation given by the following formula [1]:

$$0.5 < B/A < 5 \quad [1]$$

According to the present invention, a toner can be obtained which itself is high in blackness, when used is a master batch which makes it possible to make the carbon black be present stably in the conditions such that the carbon black has a small primary particle size and is dispersed homogeneously in the toner, is capable of achieving high image densities even with a small amount of toner, and satisfies the above described formula [1].

In the carbon black master batch of the present invention, the above described reflectance A at 400 nm and the above described reflectance B at 700 nm are both 10 or less.

When the reflectance A at 400 nm and the reflectance B at 700 nm are both 10 or less, a toner can be obtained which itself is high in blackness.

In the carbon black master batch for use in toner of the present invention, the above described reflectance A at 400 nm and the reflectance B at 700 nm fall within the range satisfying the relation given by the following formula [2]:

$$|B-A|/A \leq 0.5 \quad [2]$$

With a master batch which satisfies the above formula [2], a toner can be obtained which is high in blackness.

In the carbon black master batch for use in toner of the present invention, the DBP oil absorption of the above described carbon black is 50 ml/100 g to 150 ml/100 g.

According to the present invention, the DBP oil absorption of the carbon black is 50 ml/100 g to 150 ml/100 g, and accordingly the compatibility between the carbon black and the binder resin becomes satisfactory, the carbon black can be easily dispersed in the master batch, and thus satisfactory dispersion of the carbon black can be achieved.

The second present invention is a toner for use in electrophotography (electrostatic charge image development) that is used in an image forming method which has a mechanism for removing the toner remaining untransferred on an organic photosemiconductor by abutting a rubber like elastic blade to the above described organic photosemiconductor after a toner image obtained by developing an electrostatic latent image on the above described photosemiconductor has been transferred, wherein the toner comprises the above described carbon black master batch for use in toner and the above described binder resin.

According to the present invention, a toner for use in electrophotography can be provided which permits obtaining a desired image density with a smaller adhesion amount (consumption amount) of toner, generates neither toner scattering nor image fogging, and can stably maintain satisfactory image characteristics.

The third present invention is a toner for use in electrophotography that is used in an image forming method which has a mechanism for removing the toner remaining untransferred on an organic photosemiconductor by abutting a rubber like elastic blade to the above described organic photosemiconductor after a toner image obtained by developing an electrostatic latent image on the above described photosemiconductor has been transferred, wherein the toner comprises the above described carbon black master batch for use in toner and the above described binder resin, and the volume average particle size of the toner is 7 μm or less.

According to the present invention, a toner for use in electrophotography can be provided which permits obtaining a desired image density with a smaller adhesion amount (consumption amount) of toner, generates neither toner scattering nor image fogging, can stably maintain satisfactory image characteristics, and additionally the volume average particle size of the toner made to be 7 μm or less makes it possible to cover sheets of paper (media) with the toner particles leaving smaller blank space so that sheets of paper (media) become nondiaphanous, the concealment property is improved and the image density can be increased.

As a result of diligent investigation for the purpose of solving the above described problems in the conventional techniques, the present inventors have discovered that the particle size of carbon black in a condition dispersed in the toner (hereinafter simply referred to as the dispersion particle size of carbon black) can be made smaller by using polyester resin as a main component and by using a carbon black master batch having particular spectroscopic characteristics at the time of producing toner, and the carbon black can be dispersed in a homogeneous condition; the use of the toner makes it possible to improve the blackness of the toner itself, and consequently a desired image density can be obtained with a smaller adhesion amount (consumption amount) of the toner as compared to conventional toners.

Additionally, it has also been discovered that the dispersion property is satisfactory so that a satisfactory image quality can be stably maintained in such a way that neither toner scattering nor image fogging is generated.

DETAILED DESCRIPTION OF THE PREFERRED EMBODIMENTS

Detailed description of the present invention will now be made with reference to the preferred embodiments of the present invention.

The master batch of the present invention comprises polyester resin as a binder resin and a carbon black as a colorant of 10 nm to 100 nm in primary particle size, is blended with 30 to 60 parts by weight of the carbon black and has a lightness L* of 20 or less, wherein the reflectance A thereof at 400 nm and the reflectance B thereof at 700 nm fall within the range satisfying the relation given by the following formula [1]:

$$0.5 < B/A < 5 \qquad [1]$$

In the master batch of the present invention, the reflectance A at 400 nm and the reflectance B at 700 nm are both 10 or less.

In the master batch of the present invention, the reflectance A at 400 nm and the reflectance B at 700 nm fall within the range satisfying the relation given by the following formula [2]:

$$|B-A|/A \leq 0.5 \qquad [2]$$

In the master batch of the present invention, the DBP (dibutyl phthalate) oil absorption of the carbon black is 50 ml/100 g to 150 ml/100 g.

The toner for use in electrophotography of the present invention is used in an image forming method which has a mechanism for removing the toner remaining untransferred on an organic photosemiconductor by abutting a rubber like elastic blade to the organic photosemiconductor after a toner image obtained by developing an electrostatic latent image on the photosemiconductor has been transferred, and comprises the above described master batch and the above described binder resin.

The toner for use in electrophotography of the present invention is used in an image forming method which has a mechanism for removing the toner remaining untransferred on an organic photosemiconductor by abutting a rubber like elastic blade to the organic photosemiconductor after a toner image obtained by developing an electrostatic latent image on the photosemiconductor has been transferred, comprises the above described master batch and the above described binder resin, and the volume average particle size of the toner is 7 μm or less.

First of all, a characteristic of the carbon black master batch for use in toner of the present invention is such that polyester resin is the main component of the dispersion resin.

As described above, the carbon black master batch is fundamentally produced by preliminarily mixing a blended material mainly composed of a binder resin and a high blending ratio of carbon black, and by subsequently melt-kneading the blended material.

In the production of the carbon black master batch, first of all, the binder resin used in the production is selected on the basis of the binder resin for use in toner so that the binder resin is subjected to a fairly severe restriction in composition.

Additionally, in the above described production process, it is necessary to disperse the carbon black, having the primary particles thereof in coagulated conditions, in the binder resin in such a way that the carbon black is prevented from recoagulation and dispersed in a manner as fine and homogeneous as possible, and hence a measure is required which reinforces the interaction between the binder resin and the carbon black so that the interaction may overwhelm the coagulation force of the carbon black in the dispersed condition.

A further characteristic of the carbon black master batch for use in toner of the present invention is such that the master batch obtained as described above has the reflectance A at 400 nm and the reflectance B at 700 nm satisfying the relation given by the following formula [1]:

$$0.5 < B/A < 5 \qquad [1]$$

In general the interaction between carbon black and a light ray is mainly composed of light absorption and irregular reflection. Additionally, the smaller is the dispersion diameter of carbon black, in other words, the more satisfactory is the dispersion condition of the carbon black, the more inclined is the irregular reflection to occur for short wavelength incident light in a manner overwhelming the absorption.

More specifically, when the dispersion condition of the carbon black dispersed in the binder resin is satisfactory, the irregular reflection in the shorter wavelength region becomes high.

In other words, regular reflection hardly occurs, resulting in lowering of the reflectance.

Incidentally, the color black means that no reflected light ray comes in the visible light region.

Accordingly, in the present invention, as a measure of dispersion of carbon black in the binder resin, the reflectances at 400 nm and 700 nm are adopted; and a condition is adopted whether the following formula [1] is satisfied or not in which the reflectance at 400 nm is denoted by A and the reflectance at 700 nm by B:

$$0.5 < B/A < 5 \qquad [1]$$

More specifically, the case where B/A is larger than 5 as a measure of the dispersion property means that the reflectance B at 700 nm is high, and when an image is formed by use of a toner produced from such a carbon black master batch, it is impossible to obtain a toner for which the blackness of the toner itself is high.

Additionally, when the reflectance A at 400 nm and the reflectance B at 700 nm are both larger than 10, the regular reflection rays are more intense than the irregular reflection rays; thus it is impossible to obtain a toner for which the blackness of the toner itself is high even in a case where an image is formed with the toner produced from such a carbon black master batch.

Additionally, for the purpose of obtaining a higher blackness, it is necessary to exhibit a reflectance plateau all over the visible light region.

Accordingly, a toner high in blackness can be obtained with such a master batch having the reflectance A at 400 nm and the reflectance B at 700 nm, the respective wavelengths nearly corresponding to both ends of the visible light region, that satisfies the following formula [2]:

$$|B-A|/A \leq 0.5 \qquad [2]$$

As described above, the carbon black master batch for use in toner of the present invention is dispersed in the carbon black master batch in a manner having a small dispersion particle size and a homogeneous condition; hence, the use of the carbon black master batch permits obtaining the toner for use in the electrostatic charge image development (electrophotography) of the present invention excellent in image characteristics.

Description will be made below of this matter.

As a binder resin used in a toner for use in electrophotography of the present invention, styrene-acrylic copolymer, acrylic polymer, polyester resin and the like are well known materials in the art; in the present invention, preferable is polyester resin that exhibits a strong interaction with the carboxylic groups on the surface of carbon black.

This is because the interaction between the carboxylic groups on the surface of carbon black and the polar groups in the polyester resin prevents the mutual coagulation of carbon black, which permits providing a satisfactory dispersion condition.

Polyester resin can be synthesized from the following exemplified polyalcohols and polycarboxylic acids, but the starting materials are not limited to these alcohols and acids.

Examples of the polyalcohols include the following dialcohols: 1,2-ethanediol, 1,2-propanediol, 1,3-propanediol, 1,4-butanediol, 2,3-butanediol, diethyleneglycol, triethyleneglycol, 1,5-pentanediol, 1,6-hexanediol, neopentylglycol, 1,4-cyclohexanedimethanol, dipropyleneglycol, polyethyleneglycol, polypropyleneglycol, bisphenol A, hydrogenated bisphenol A, and the bisphenol A alkyleneoxide adducts including polyoxyethylenated bisphenol A and polyoxypropylenated bisphenol A (bisphenol A propyleneoxide).

Additionally, for the purpose of nonlinearization of polymer to such an extent that no tetrahydrofuran-insoluble content is generated, such polyalcohols as triols or higher polyalcohols can also be used.

Examples of the triols or higher polyalcohols include glycerin, sorbitol, 1,2,3,6-hexanetetraol, 1,4-sorbitan, pentaerythritol, 1,2,4-butanetriol, 1,2,5-pentanetriol, 2-methylpropanetriol, 2-methyl-1,2,4-butanetriol, trimethylolethane, trimethylolpropane and 1,3,5-trihydroxymethylbenzene.

On one hand, examples of polycarboxylic acids include such dicarboxylic acid as maleic acid, fumaric acid, mesaconic acid, citraconic acid, itaconic acid, glutaconic acid, phthalic acid, terephthalic acid, isophthalic acid, cyclohexanedicarboxylic acid, malonic acid, succinic acid, adipic acid, sebacic acid, glutaric acid and alkylsuccinic acids (for example, n-octylsuccinic acid and n-dodecenylsuccinic acid); trimellitic acid; and the acid anhydrides and alkyl esters thereof.

Examples of the combinations of the above described polyalcohols and polycarboxylic acids include a combination of bisphenol A propyleneoxide with terephthalic acid/fumaric acid, trimellitic anhydride, or combinations thereof.

Examples of commercially available carbon blacks usable in the present invention include REGAL 400R, 500R, 660R manufactured by U.S. Cabot Corp. (U.S.A.); RAVEN H20, RAVEN 16, RAVEN 14, RAVEN 430, RAVEN 450, RAVEN 500 manufactured by Columbian Carbon Japan, Ltd.; and Printex 200, Printex A, Special Black 4, Printex G manufactured by Degussa Co., Ltd. (West Germany); however, usable carbon blacks are not limited to the above cited ones.

Additionally, these carbon blacks can be used each alone or in combinations of two or more types thereof in various compositions.

When the primary particle size of a carbon black is smaller than 10 nm, the specific surface area and coagulation force of the carbon black become large, making it extremely difficult to disperse the carbon black in the binder resin.

On the other hand, when the primary particle size of a carbon black is larger than 100 nm, the blackness of the carbon black itself is lowered so that the production of a master batch by use of such a carbon black and the following production of a toner for use in electrophotography by use of the master batch thus produced cannot lead to achievement of sufficient image density.

From the above, it is preferable that the primary particle size of the carbon black falls within the range from 10 nm to 100 nm, more preferably from 10 nm to 60 nm.

In the present invention, the master batch is the one in which such a carbon black is blended in the concentration of 5 to 60 wt %; with the carbon black concentration lower than 30 wt %, it is difficult to homogeneously disperse the carbon black in the binder resin.

In such a case, it is recommended that a master batch is once prepared in which the carbon black concentration is 30 wt % or more, and is diluted to yield a master batch having a desired carbon black concentration.

Additionally, with the carbon black concentration exceeding 60 wt % in the master batch, the viscosity of the master batch itself becomes high, the homogeneous diffusivity of the carbon black into the binder resin becomes low, and the dispersibility of the carbon black is lowered.

Accordingly, it is unpreferable that the carbon black concentration in the master batch becomes too high, but it is preferable that the carbon black concentration in the master batch falls in the content range from 30 to 60 wt %.

Now, the DBP oil absorption of carbon black is derived as follows: 20 g of carbon black is placed in a plastograph; the carbon black is kneaded with a kneader while DBP (dibutylphthalate) is added dropwise, where the kneader should be equipped with a torque meter; with the increase of the added amount of DBP, the torque value continues to increase and reaches a maximum value when the DBP amount is read; the DBP amount thus determined is converted to a value in relation to 100 g of carbon black, which gives the above described DBP oil absorption.

In general, the larger is the DBP oil absorption, the longer is the carbon black chain structure, the more inclined are conductive paths to be formed in the toner particles, and the more inclined is the charge leak to occur.

Additionally, the larger is the DBP oil absorption of the carbon black, the better becomes the compatibility with the binder resin, facilitating the dispersion of the carbon black in the master batch.

As described above, it becomes difficult to attain a satisfactory dispersion of the carbon black when the DBP oil absorption of the carbon black is too small, while on the contrary the charging property of the toner is degraded when the DBP oil absorption of the carbon black is too large; accordingly, it is preferable that the DBP oil absorption of the carbon black falls within the range from 50 ml/100 g to 150 ml/100 g.

The master batch of the present invention can be obtained by means of a variety of mixing methods.

In general, for example, a method is used in which the powder or pellet of a binder resin for the master batch is mixed with carbon black as a pigment for coloring by means of a tumbler or a supermixer, and then the mixture is heated and melt-kneaded into either pellets or coarse grains by means of a kneader such as an extruder, a banbury mixer or the like.

Additionally, another method is used in which mixing is conducted at the stage of synthesizing the polycarbonate oligomer.

For example, a master batch can also be obtained as follows: after carbon black has been added to and mixed with the polycarbonate oligomer in completion of the reaction and in a solution condition, the solvent is removed from the mixture, and the mixture thus treated is kneaded into a master batch by means of a kneader such as an extruder, a banbury mixer or the like.

According to the desired purpose, into the master batch of the present invention, the following additives can be blended: a variety of additives well known in the art added to resin compositions including reinforcing agents, fillers, stabilizers, ultraviolet absorbers, antistatic agents, lubricants, releasing agents, dyes and pigments; and other additives including fire retardants, elastomers for improving impact resistance and the like.

Particularly, the addition of lubricants, releasing agents or elastomers for improving impact resistance, among these additives, is suitable for lowering the viscosity of the master batch.

The blending of these additives depends on the types and amounts of the additives; these additives can be beforehand mixed in carbon black or polycarbonate oligomer as the base resin; or these additives can be mixed in polycarbonate oligomer when carbon black and polycarbonate oligomer as the base resin are melt-kneaded or after the melt-kneading process has been completed.

It is preferable that the addition of lubricants, releasing agents and the like are mixed when carbon black and polycarbonate oligomer as the base resin are melt-kneaded, or after the melt-kneading process has been completed.

The carbon black master batch obtained in the above described way is crushed to an appropriate particle size, is then preliminarily mixed together with a binder resin, an electric charge control agent and other additives, selected so as to satisfy various characteristics required for the toner such as developability, transferability, fixability and the like, and subsequently, according to the production method of toner within the conventional framework, the mixture is subjected to the processes of melt-kneading, cooling, coarse crushing/pulverizing, classifying, treating with external additives and the like, thus the toner being produced.

The toner for use in electrophotography of the present invention may be made to contain a releasing agent as the case may be.

Examples of the releasing agent include arbitrary releasing agents, themselves well known in the art, inclusive of aliphatic compounds such as aliphatic resins, aliphatic metal salts, higher fatty acids, fatty acid esters and partially saponificated compounds thereof, and the like.

Specifically, the following can be used: for example, low molecular weight polypropylene, high molecular weight polyethylene, paraffin wax, low molecular weight olefin polymers made of olefin monomers having four or more carbon atoms, silicone oil, various types of waxes and the like.

The toner for use in electrophotography of the present invention maybe subjected to the external additive treatment for the purpose of improving fluidity.

External additives have only to be those additives which can improve the fluidity of the toner after addition thereof through adding thereof to the toner particles, and are not particularly limited otherwise.

As the external additives, for example, fine silica powder, fine titanium oxide powder, fine alumina powder, and the powders obtained by subjecting these fine powders to hydrophobization treatment can be used each alone or in combinations of two or more types thereof.

The toner for use in electrophotography of the present invention can be added with an electric charge control agent, according to need.

Examples of the electric charge control agent include, for example, oil-soluble dyes such as nigrosine dye, oil black, spiro black and the like; metallic soaps as metal salts between the acids such as naphthenic acid, octylic acid, fatty acids and resin acids, and the metals such as manganese, iron, cobalt, nickel, lead, zinc, cerium and calcium; metal containing azo dyes; pyrimidine compounds; and the metallic compounds between salicylic acid and derivaties thereof and the metals such as chromium, aluminum and iron.

Normally, these additives are used in the contents of 0.1 to 10 parts by weight in relation to the developer.

As for the toner particle, a particle having an average particle size of 7 μm is used.

As the average particle size of the toner is decreased, the toner particles become able to cover sheets of paper (media) with the toner particles leaving smaller blank space so that sheets of paper (media) become nondiaphanous, and hence the concealment property is improved.

In other words, even with the same adhesion amount of the toner, when the average particle size of the toner is small, the image density can be increased.

On the other hand, with the average particle size of the toner smaller than 4 μm, handling of the toner becomes difficult and adverse effects on the human body are provided.

From the above, the average particle size of the toner is preferably 7 μm or less, more preferably 4 μm to 7 μm.

When the toner is used as a toner for use in the two-component development, the toner is mixed with the following carriers to prepare the developer: noncoated carriers including glass beads, oxidized or nonoxidized iron powder, ferrite and the like; and coated carriers including magnetic materials such as iron, nickel, cobalt and ferrite coated with the polymers such as acrylic polymer, fluororesin polymer, polyester and denatured silicone resin.

It is preferable that the above described carriers have generally an average particle size of 30 to 500 μm, and the toner concentration (T/D) is 1 to 15%.

The toners thus obtained can be applied to all the electrostatic charge image development methods well known in the art.

More specifically, the toners are used in the two-component development methods such as cascade method, magnetic brush method, and micro-toning method; the one-component development methods using a magnetic toner such as the conductive one-component development method, insulative one-component development method, and toner projection development method; the powder cloud method and the fur brush method; the nonmagnetic one-component development method in which the toner is held electrostatically on a support and is thereby conveyed to the development section to perform development; the electric field curtain development method in which the toner is conveyed to the development section to perform development and the like.

Additionally, the toners can be used in an image forming method based on the toner jet scheme.

Now, description will be made below of the measurement method of the lightness L* of a master batch, and the reflectance A of a master batch at 400 nm and the reflectance B of a master batch at 700 nm.

A master batch of 70 g is crushed for 60 seconds by means of a crusher (A10) manufactured by IKA Co., Ltd. and is screened with a 300 mesh sieve.

Then, 4.0 g of the fraction that has passed through the sieve is weighed out, subjected to tapping 20 times in a glass petri dish appended to a CM-3500d manufactured by Minolta Co., Ltd., subjected to measurement of the lightness L* and reflectances by means of a CM-3500d manufactured by Minolta Co., Ltd., and thus the lightness L* of the master batch, the reflectance A at 400 nm of the master batch and the reflectance B at 700 nm of the master batch are obtained.

Then, description will be made below of the measurement method of the triboelectric charge on a toner.

Figure 1:
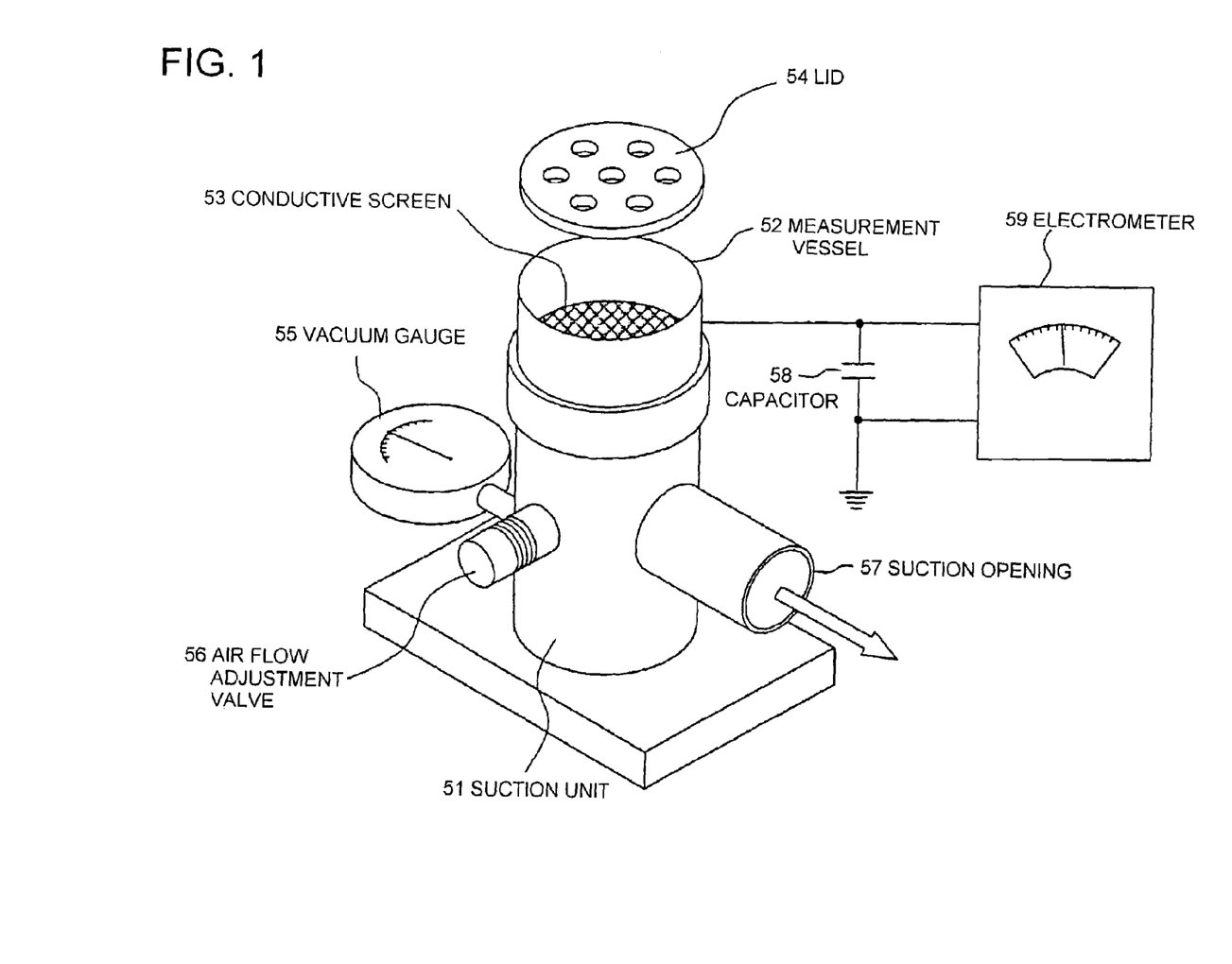
FIG. 1 is an illustrative view of a triboelectric charge measurement apparatus for measuring the triboelectric charge on a toner used in the present invention.

FIG. 1 is an illustrative view of a triboelectric charge measurement apparatus for measuring the triboelectric charge on a toner used in the present invention.

The triboelectric charge measurement apparatus comprises, as FIG. 1 shows, a suction unit 51 equipped with a suction opening 57, a metal measurement vessel 52 arranged above the suction unit 51, a 500 mesh screen 53 arranged at the bottom of the measurement vessel 52, a metal lid 54 for closing the upper end opening of the measurement vessel 52, a vacuum gauge 55 attached to the suction unit 51, an air flow adjustment valve 56 attached to the suction unit 51, a capacitor 58, and an electrometer 59.

In the metal measurement vessel 52 having the 500 mesh screen 53 at the bottom thereof, approximately 0.5 to 1.5 g of a two-component developer obtained from the developing sleeve of a copying machine or a printer is placed, and the upper end opening of the measurement vessel 52 is covered with the metal lid 54.

Then, the weight of the whole measurement vessel 52 is measured which is denoted by W1 (g).

Then, in the suction unit 51 (at least the portion thereof in contact with the measurement vessel 52 being made of an insulating material), suction is conducted from the suction opening 57, and the pressure as measured on the vacuum gauge 55 is made to be 250 mmAq by adjusting the air flow adjustment valve 56.

Under this condition, suction is fully conducted, preferably for 2 minutes and the toner is sucked in and removed.

The electric potential read then on the electrometer 59 is denoted by V (volts).

Here, reference numeral 58 denotes the capacitor and the capacitance thereof is denoted by C (mF).

Additionally, the weight of the whole measurement vessel 52 after suction is denoted by W2 (g).

The triboelectric charge (mC/kg) of the sample concerned is derived as shown in the following formula [3]:

$$\text{Triboelectric charge of a sample (mC/kg)} = C \times V/(W1-W2) \quad [3]$$

(Here, the measurement conditions of 23° C. and 60% RH are adopted.)

The carrier for use in measurement is a coated ferrite carrier in which the fraction of the 250 mesh pass/350 mesh on carrier particles is 70 to 90 mass %.

EXAMPLES

Description will be made below of the present invention with reference to the examples, but the present invention is not limited to the examples.

Production Example 1

By means of a supermixer, 50 parts by weight of a polyester resin and 50 parts by weight of a carbon black, having such physical properties that the primary particle size was 40 nm and the DBP oil absorption was 100 ml/100 g, were mixed together homogeneously, and then the mixture thus obtained was melt-kneaded by means of a twin screw extruder to yield a master batch 1.

The lightness L*, reflectance A at 400 nm and reflectance B at 700 nm of the master batch 1 were measured by means of a CM-3500d manufactured by Minolta Co., Ltd., and the B/A and |B−A|/A values were derived.

Consequently, satisfactory optical characteristics were found to be exhibited.

Production Example 2

A master batch 2 was obtained in a manner similar to that in Production Example 1 except that the melt-kneading conditions were varied.

Additionally, in a manner similar to that in Production Example 1, the lightness L*, reflectance A at 400 nm and reflectance B at 700 nm of the master batch 2 were measured, and the B/A and |B−A|/A values were derived.

Consequently, satisfactory optical characteristics were found to be exhibited.

Production Example 3

A master batch 3 was obtained in a manner similar to that in Production Example 1 except that the melt-kneading conditions were varied.

Additionally, in a manner similar to that in Production Example 1, the lightness L*, reflectance A at 400 nm and reflectance B at 700 nm of the master batch 3 were measured, and the B/A and |B−A|/A values were derived.

Consequently, satisfactory optical characteristics were found to be exhibited, although slightly inferior to the optical characteristics found in Production Examples 1 and 2.

Production Example 4

A master batch 4 was obtained in a manner similar to that in Production Example 1 except that the melt-kneading conditions were varied.

Additionally, in a manner similar to that in Production Example 1, the lightness L*, reflectance A at 400 nm and reflectance B at 700 nm of the master batch 4 were measured, and the B/A and |B−A|/A values were derived.

Consequently, satisfactory optical characteristics were found to be exhibited, although slightly inferior to the optical characteristics found in Production Examples 1 and 2.

Production Example 5

A master batch 5 was obtained in a manner similar to that in Production Example 1 except that the melt-kneading conditions were varied.

Additionally, in a manner similar to that in Production Example 1, the lightness L*, reflectance A at 400 nm and reflectance B at 700 nm of the master batch 5 were measured, and the B/A and |B−A|/A values were derived.

Consequently, no satisfactory optical characteristics were obtained.

Production Example 6

A master batch 6 was obtained in a manner similar to that in Production Example 1 except that the melt-kneading conditions were varied.

Additionally, in a manner similar to that in Production Example 1, the lightness L*, reflectance A at 400 nm and reflectance B at 700 nm of the master batch 6 were measured, and the B/A and |B−A|/A values were derived.

Consequently, no satisfactory optical characteristics were obtained.

Production Example 7

A master batch 7 was obtained in a manner similar to that in Production Example 1 except that the melt-kneading conditions were varied.

Additionally, in a manner similar to that in Production Example 1, the lightness L*, reflectance A at 400 nm and reflectance B at 700 nm of the master batch 7 were measured, and the B/A and |B−A|/A values were derived.

Consequently, no satisfactory optical characteristics were obtained.

Production Example 8

A master batch 8 was obtained in a manner similar to that in Production Example 1 except that the melt-kneading conditions were varied.

Additionally, in a manner similar to that in Production Example 1, the lightness L*, reflectance A at 400 nm and reflectance B at 700 nm of the master batch 8 were measured, and the B/A and |B−A|/A values were derived.

Consequently, no satisfactory optical characteristics were obtained.

Production Example 9

A master batch 9 was obtained in a manner similar to that in Production Example 1 except that a carbon black was used which has such physical properties that the primary particle size was 50 nm and the DBP oil absorption was 35 ml/100 g.

Additionally, in a manner similar to that in Production Example 1, the lightness L*, reflectance A at 400 nm and reflectance B at 700 nm of the master batch 9 were measured, and the B/A and |B−A|/A values were derived.

Consequently, satisfactory optical characteristics were found to be exhibited, although slightly inferior to the optical characteristics found in Production Examples 1 and 2.

Production Example 10

A master batch 10 was obtained in a manner similar to that in Production Example 1 except that a carbon black was used which has such physical properties that the primary particle size was 45 nm and the DBP oil absorption was 140 ml/100 g.

Additionally, in a manner similar to that in Production Example 1, the lightness L*, reflectance A at 400 nm and reflectance B at 700 nm of the master batch 10 were measured, and the B/A and |B−A|/A values were derived.

Consequently, satisfactory optical characteristics were found to be exhibited.

Production Example 11

A master batch 11 was obtained in a manner similar to that in Production Example 1 except that a carbon black was used which has such physical properties that the primary particle size was 35 nm and the DBP oil absorption was 15 ml/100 g.

Additionally, in a manner similar to that in Production Example 1, the lightness L*, reflectance A at 400 nm and reflectance B at 700 nm of the master batch 11 were measured, and the B/A and |B−A|/A values were derived.

Consequently, no satisfactory optical characteristics were found to be exhibited.

Production Example 12

A master batch 12 was obtained in a manner similar to that in Production Example 1 except that a carbon black was used which has such physical properties that the primary particle size was 35 nm and the DBP oil absorption was 170 ml/100 g.

Additionally, in a manner similar to that in Production Example 1, the lightness L*, reflectance A at 400 nm and reflectance B at 700 nm of the master batch 12 were measured, and the B/A and |B−A|/A values were derived.

Consequently, satisfactory optical characteristics were found to be exhibited.

Table 1 shows the physical property values of the carbon blacks in the master batches, the measurement results of the lightness L* and measurement results of the reflectance A at 400 nm and reflectance B at 700 nm of the master batches, and the calculated results of the B/A and |B−A|/A values, in the above described Production Examples 1 to 12.

TABLE 1

| Master batch | Carbon black | | | Reflectance | | | |
| --- | --- | --- | --- | --- | --- | --- | --- |
| | Primary particle size | DBP oil absorption | Lightness L* | A (400 nm) | B (700 nm) | B/A | |B−A|/A |
| Master batch 1 | 40 | 100 | 12.4 | 2.0 | 2.8 | 1.4 | 0.4 |
| Master batch 2 | 40 | 100 | 13.5 | 6.0 | 3.6 | 0.6 | 0.4 |
| Master batch 3 | 40 | 100 | 17.5 | 2.5 | 12.0 | 4.8 | 3.8 |
| Master batch 4 | 40 | 100 | 18.0 | 2.0 | 8.0 | 4.0 | 3.0 |
| Master batch 5 | 40 | 100 | 18.3 | 12.5 | 5.0 | 0.4 | 0.6 |
| Master batch 6 | 40 | 100 | 19.1 | 3.4 | 18.7 | 5.5 | 4.5 |
| Master batch 7 | 40 | 100 | 19.7 | 12.0 | 36.0 | 3.0 | 2.0 |
| Master batch 8 | 40 | 100 | 18.6 | 15.4 | 7.0 | 2.2 | 0.6 |
| Master batch 9 | 50 | 35 | 15.3 | 4.5 | 9.0 | 2.0 | 1.0 |
| Master batch 10 | 45 | 140 | 14.2 | 1.8 | 3.0 | 1.7 | 0.4 |
| Master batch 11 | 35 | 15 | 18.6 | 4.0 | 10.0 | 2.5 | 1.5 |
| Master batch 12 | 35 | 170 | 14.9 | 2.4 | 8.4 | 3.5 | 2.5 |

Example 1

| | |
| --- | --- |
| Binder resin (based on polyester) | 80 parts |
| Master batch 1 | 20 parts |
| Organometallic compound | 2 parts |
| Polypropylene wax | 4 parts |

The above described materials were mixed together homogeneously, the mixture thus obtained was kneaded by means of a twin screw extruder with an internal temperature of 150° C., then the cooled, kneaded mixture was crushed by means of a jet mill and classified by means of a dispersion separator, to yield a colorant containing particle of 6.5 μm in average particle size.

In the colorant containing particle, one part of a commercially available silica (the average primary particle size was 0.1 μm and the degree of hydrophobization was 50%) was mixed and dispersed to yield a toner 1.

Example 2

A toner 2 was obtained in a manner similar to that in Example 1 except that the master batch 2 was used.

Example 3

A toner 3 was obtained in a manner similar to that in Example 1 except that the master batch 3 was used.

Example 4

A toner 4 was obtained in a manner similar to that in Example 1 except that the master batch 4 was used.

Comparative Example 1

A toner 5 was obtained in a manner similar to that in Example 1 except that the master batch 5 was used.

Comparative Example 2

A toner 6 was obtained in a manner similar to that in Example 1 except that the master batch 6 was used.

Comparative Example 3

A toner 7 was obtained in a manner similar to that in Example 1 except that the master batch 7 was used.

Comparative Example 4

A toner 8 was obtained in a manner similar to that in Example 1 except that the master batch 8 was used.

Example 5

A toner 9 was obtained in a manner similar to that in Example 1 except that the master batch 9 was used.

Example 6

A toner 10 was obtained in a manner similar to that in Example 1 except that the master batch 10 was used.

Comparative Example 5

A toner 11 was obtained in a manner similar to that in Example 1 except that the master batch 11 was used.

Comparative Example 6

A toner 12 was obtained in a manner similar to that in Example 1 except that the master batch 12 was used.

Comparative Example 7

A toner 13 was obtained in a manner similar to that in Example 1 except that the average particle size was made to be 7.5 μm.

For the toners obtained in the above described Examples and Comparative Examples, evaluation tests were performed on the basis of the following methods.

(1) Blackness

A ferrite carrier (F-150, manufactured by Powder Tech Co., Ltd.) was homogeneously mixed in the toners 1 to 13, and the developers thus obtained were actually charged in a commercially available copying machine (AR-505, manufactured by Sharp Co., Ltd.), and the following evaluation was conducted.

At the beginning, a developer was charged in the copying machine AR-505 (manufactured by Sharp Co., Ltd.), solid black images extending all over a sheet were taken while the toner concentration in the developer was being varied, the optical reflection densities thereof were measured as the image densities thereof by means of a reflection densitometer RD-915 (manufactured by Macbeth Co., Ltd.), and thus the lowest toner concentration providing an image density exceeding 1.40 was obtained, accordingly the evaluation of the toner being made on the basis of the following standards.

E: Smaller than 3.5%

G: Equal to or larger than 3.5% and smaller than 4%

M: Equal to or larger than 4% and smaller than 5%

P: Equal to or larger than 5%

(2) Electrostatic Propensity

A ferrite carrier (96 parts) (F-150, manufactured by Powder Tech Co., Ltd.) was homogeneously mixed in the respective toners (4 parts) 1 to 13, and the developers thus obtained were actually charged in a commercially available copying machine (AR-505, manufactured by Sharp Co., Ltd.); the charge amounts were measured in an environment such that the temperature was 25° C. and the humidity was 50%, and then the charge mounts were measured in an environment such that the temperature was 35° C. and the humidity was 80%.

The variation ratio, {(the charge amount at 25° C./50%)−(the charge amount at 35° C./80%)}/(the charge amount at 25° C./50%), was evaluated on the basis of the following standards.

E: Smaller than 5%

G: Equal to or larger than 5% and smaller than 10%

M: Equal to or larger than 10% and smaller than 20%

P: Equal to or larger than 20%

The results obtained from the above described evaluations are shown in Table 2.

TABLE 2

| | Master batch used | Reflectances | | | | Toner particle size | Blackness | Electrostatic propensity | Overall evaluation |
|---|---|---|---|---|---|---|---|---|---|
| | | A (400 nm) | B (700 nm) | B/A | |B−A|/A | | | | |
| Example 1 | Master batch 1 | 2.0 | 2.8 | 1.4 | 0.4 | 6.5 | E | E | E |
| Example 2 | Master batch 2 | 6.0 | 3.6 | 0.6 | 0.4 | 6.5 | E | E | E |

TABLE 2-continued

Results of evaluations

| | Master batch used | Reflectances | | | | Toner particle size | Blackness | Electro-static propensity | Overall evaluation |
|---|---|---|---|---|---|---|---|---|---|
| | | A (400 nm) | B (700 nm) | B/A | \|B-A\|/A | | | | |
| Example 3 | Master batch 3 | 2.5 | 12.0 | 4.8 | 3.8 | 6.5 | G | G | G |
| Example 4 | Master batch 4 | 2.0 | 8.0 | 4.0 | 30 | 6.5 | G | G | G |
| Comparative Example 1 | Master batch 5 | 12.5 | 5.0 | 0.4 | 0.6 | 6.5 | P | M | P |
| Comparative Example 2 | Master batch 6 | 3.4 | 18.7 | 5.5 | 4.5 | 6.5 | P | M | P |
| Comparative Example 3 | Master batch 7 | 12.0 | 36.0 | 3.0 | 2.0 | 6.5 | M | M | M |
| Comparative Example 4 | Master batch 8 | 15.4 | 7.0 | 2.2 | 0.6 | 6.5 | M | M | M |
| Example 5 | Master batch 9 | 4.5 | 9.0 | 2.0 | 1.0 | 6.5 | M | E | G |
| Example 6 | Master batch 10 | 1.8 | 3.0 | 1.7 | 0.4 | 6.5 | G | M | G |
| Comparative Example 5 | Master batch 11 | 4.0 | 10.0 | 2.5 | 1.5 | 6.5 | P | G | M |
| Comparative Example 6 | Master batch 12 | 2.4 | 8.4 | 3.5 | 2.5 | 6.5 | M | M | M |
| Comparative Example 7 | Master batch 1 | 2.0 | 6.0 | 3.0 | 0.4 | 7.5 | P | E | G |

As can be seen from Table 2, the toners of Examples 1 to 6 were given the overall evaluation of E or G so that the toners are satisfactory toners, while the toners of Comparative Examples 1 to 6 were given the overall evaluation of M or P, and the toner of Comparative Example 7 was given the overall evaluation of G but the blackness was evaluated to be P so that these toners can be said to be inappropriate toners.

According to the master batch of the present invention, a toner can be obtained which can make the carbon black in the toner be present stably in the conditions such that the carbon black has a small primary particle size and is homogeneously dispersed in the toner, can achieve a high image density even with a small amount of the toner, and itself has a high blackness.

According to the toner for use in electrophotography of the present invention, a desired image density can be obtained with a smaller adhesion amount (consumption amount) of the toner, and additionally neither toner scattering nor image fogging is generated so that satisfactory image characteristics can be stably maintained.

According to the toner for use in electrophotography of the present invention, a desired image density can be obtained with a smaller adhesion amount (consumption amount) of the toner, and additionally neither toner scattering nor image fogging is generated so that satisfactory image characteristics can be stably maintained; furthermore, the volume average particle size of the toner is 7 μm or less, and hence the toner particles become capable of covering sheets of paper (media) leaving smaller blank space so that sheets of paper (media) become nondiaphanous, the concealment property is improved and the image density can be increased.

What is claimed is:

1. A master batch comprising a polyester resin as a binder resin and carbon black as a colorant, said carbon black having a primary particle size of 10 nm to 100 nm, and being present in said master batch in an amount of 30 to 60 parts by weight of the master batch, said mater batch having a lightness L* of 20 or less, wherein
the reflectance A of the master batch at 400 nm and the reflectance B of the master batch at 700 nm fall within the range satisfying the relation given by the following formula [1]:

$0.5 < B/A < 5$ [1];

and said polyester resin comprises at least one nonaromatic group.

2. The master batch according to claim 1, wherein said reflectance A at 400 nm and said reflectance B at 700 nm are both 10 or less.

3. The master batch according to claim 1, wherein said reflectance A at 400 nm and said reflectance B at 700 nm fall within a range satisfying the relation given by the following formula [2]:

$|B-A|/A \leq 0.5$ [2]

4. The master batch according to claim 1, wherein the DBP oil absorption of said carbon black is 50 ml/100 g to 150 ml/100 g.

5. A toner for use in electrophotography which is used in an image forming method which has a mechanism for removing the toner remaining untransferred on an organic photosemiconductor by abutting a rubber like elastic blade to said organic photosemiconductor after a toner image obtained by developing an electrostatic latent image on said photosemiconductor has been transferred, wherein the toner comprises the master batch described in claim 1 and said binder resin.

6. A toner for use in electrophotography which is used in an image forming method which has a mechanism for removing the toner remaining untransferred on an organic photosemiconductor by abutting a rubber like elastic blade to said organic photosemiconductor after a toner image obtained by developing an electrostatic latent image on said photosemiconductor has been transferred, wherein the toner comprises the master batch described in claim 1 and said binder resin, and the volume average particle size of the toner is 7 µm or less.

7. The master batch of claim 1 wherein said polyester resin is synthesized from at least one polyalcohol selected from the group consisting of 1,2-ethanediol, 1,2-propanediol, 1,3-propanediol, 1,4-butanediol, 2,3-butanediol, diethyleneglycol, triethyleneglycol, 1,5-pentanediol, 1,6-hexanediol, neopentylglycol, 1,4-cyclohexanedimethanol, dipropyleneglycol, polyethyleneglycol, polypropyleneglycol, glycerin, sorbitol, 1,2,3,6-hexanetetraol, 1,4-sorbitan, pentaerythritol, 1,2,4-butanetriol, 1,2,5-pentanetriol, 2-methylpropanetriol, 2-methyl-1,2,4-butanetriol, trimethylolethane, and trimethylolpropane.

8. The master batch of claim 1 wherein said polyester resin is synthesized from at least one polycarboxylic and selected from the group consisting of maleic acid, fumaric acid, mesaconic acid, citraconic acid, itaconic acid, glutaconic acid, cyclohexanedicarboxylic acid, malonic acid, succinic acid, adipic acid, sebacic acid, glutaric acid, an alkylsuccinic acid, an acid anhydride of any one of maleic acid, fumaric acid, mesaconic acid, citraconic acid, itaconic acid, glutaconic acid, cyclohexanedicarboxylic acid, malonic acid, succinic acid, adipic acid, sebacic acid, glutaric acid, and an alkylsuccinic acid, and an alkyl esters of any one of maleic acid, fumaric acid, mesaconic acid, citraconic acid, itaconic acid, glutaconic acid, cyclohexanedicarboxylic acid, malonic acid, succinic acid, adipic acid, sebacic acid, glutaric acid, and an alkylsuccinic acid.

* * * * *